(12) United States Patent
Coll et al.

(10) Patent No.: US 6,624,583 B1
(45) Date of Patent: Sep. 23, 2003

(54) METHOD AND APPARATUS FOR PLASMA TREATING A CHEMICAL SPECIES

(75) Inventors: Bernard F. Coll, Fountain Hills, AZ (US); Paul A. Vonallmen, Phoenix, AZ (US); Frederic Zenhausern, Fountain Hills, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/185,627

(22) Filed: Jun. 28, 2002

(51) Int. Cl.$^7$ .................................................. H01J 7/24
(52) U.S. Cl. .......................... 315/111.71; 315/111.21; 315/111.91; 315/39.55; 313/581; 313/618; 333/221; 333/231
(58) Field of Search ............... 315/111.01, 111.21, 315/111.71, 111.91, 39.55, 39.57; 313/306, 574, 581, 567, 631, 632, 618, 637; 333/13, 221, 227, 231, 99 PL; 427/590, 906; 250/309, 304, 311

(56) References Cited

U.S. PATENT DOCUMENTS

| | | | | |
|---|---|---|---|---|
| 4,274,063 A | * | 6/1981 | Javan | 372/55 |
| 4,919,974 A | * | 4/1990 | McCune et al. | 427/249.7 |
| 4,965,540 A | * | 10/1990 | Sullivan | 333/227 |
| 6,433,480 B1 | * | 8/2002 | Stark et al. | 313/631 |
| 6,586,885 | * | 7/2003 | Coll et al. | 315/111.21 |

* cited by examiner

*Primary Examiner*—Haissa Philogene
(74) *Attorney, Agent, or Firm*—William E. Koch

(57) ABSTRACT

A method of treating a first chemical species in a gas using a plasma, the method including the steps of providing an array of micro-scale cavity discharge devices capable of sustaining the plasma where the first chemical species is capable of flowing proximate to the array of micro-scale cavity discharge devices, wherein the first chemical species is converted to a second chemical species within the plasma.

51 Claims, 2 Drawing Sheets

METHOD AND APPARATUS FOR PLASMA TREATING A CHEMICAL SPECIES

FIELD OF THE INVENTION

This invention relates generally to micro scale cavity discharge devices, and, more particularly, to generating a plasma for chemical processing applications.

BACKGROUND OF THE INVENTION

Exhaust gases from combustion processes constitute one of the main sources of harmful atmospheric pollutants. These pollutants include, but are not limited to, nitrogen oxide (NO), sulfur oxide (SO), soot, volatile organic compounds, hydrocarbons (hydrocarbons are compounds that include two types of elements, carbon (C) and hydrogen (H), such as methane ($CH_4$)), carbon oxide (CO), or the like. It is understood by those skilled in the art that nitrogen oxide (NO) includes $N_2O$, $NO_2$, $N_2O_4$, and other similar nitrogen-oxygen compounds. Further, it will be understood that sulfur oxide (SO) includes $SO_2$ and other well-known sulfur-oxygen compounds and that carbon oxide (CO) includes $CO_2$, and other similar carbon-oxygen compounds.

The three-way catalytic converter, which effectively eliminates nitrogen oxide, hydrocarbons, and carbon oxide, is the state of the art specifically for a spark-ignition engine. The catalytic converter is suitable for diesel exhaust gases to only a limited degree because only the hydrocarbons and carbon oxide are largely decomposed, but nitrogen oxide cannot be reduced because of the high oxygen (O) content in the exhaust gas. Until now there has not been any type of catalytic converter with a sufficiently high noxious-substance decomposition rate and lifetime for these types of engines.

Electrostatic filters are well known and commonly utilized especially in controlling particulate emissions. Other forms of electrical discharge devices for the same or similar purposes are less well known but available. For example, there are corona and pulsed corona cells, silent barrier discharge devices, and surface discharge devices.

Generally, in electrostatic precipitators, a high voltage is applied to electrodes to produce a corona discharge. Molecules or compounds in the gas flowing through the device are ionized by electrons and ions of the corona discharge to increase the chemical reactivity. It is known that the conversion efficiency of these devices can be increased if beam-like electrons (electrons having energies higher than about 50 electron volts) are used rather than lower energy thermal-like electrons (electrons having energies typically less than one to two electron volts).

Thermal electrons are produced about 50 nanoseconds after a high-voltage pulse is applied and the higher energy beam-like electrons are dissipated as soon as the thermalized electrical discharge takes place. It would be desirable of course to produce beam-like electrons rather than thermal-like electrons to achieve the highest efficiency. Prior art embodiments have a low chemical conversion efficiency, are not compatible with some chemicals, have a short lifetime, are not selective in regards to the particulate size.

Accordingly, it is an object of the present invention to provide a new and improved method and apparatus for plasma treatment of a chemical species using a micro-scale cavity discharge device wherein the device has an improved performance and a longer lifetime.

SUMMARY OF THE INVENTION

To achieve the objects and advantages specified above and others, a method and apparatus for treating a chemical species with a concentration of reactants using a plasma is disclosed. In the preferred embodiment, the method includes the steps of providing an array of micro-scale cavity discharge devices capable of sustaining the plasma wherein the array of devices is defined by a ceramic material assembly. In the preferred embodiment, the chemical species flows proximate to the array of micro-scale cavity discharge devices wherein the plasma interacts with at least a portion of the chemical species to modify the concentration of reactants.

Further, in the preferred embodiment, the array of devices is formed into a screen wherein the chemical species is capable of flowing therethrough. Typically, the chemical species includes hyrdrocarbons, carbon oxide (CO), nitrogen oxide (NO), sulfur oxide (SO), or combinations thereof. The chemical species can be that generated by a diesel engine or the like wherein the array of micro-scale cavity discharge devices are positioned within an exhaust system or similar apparatus.

BRIEF DESCRIPTION OF THE DRAWINGS

The foregoing and further and more specific objects and advantages of the instant invention will become readly apparent to those skilled in the art from the following detailed description of a preferred embodiment thereof taken in conjunction with the following drawings.

DETAILED DESCRIPTION OF THE PREFERRED EMBODIMENT

Figure 1:
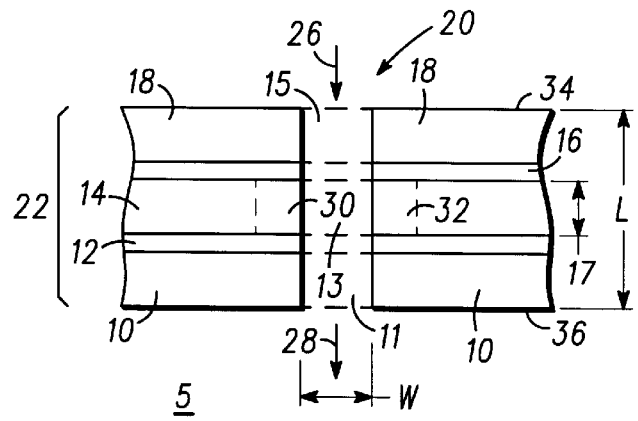
FIG. 1 is a sectional view of a micro-scale cavity discharge device in accordance with the present invention.

Turn now to FIG. 1 which illustrates an example of a micro-scale cavity discharge (hereinafter referred to as "MSCD") device 5 used to illustrate a method to treat a chemical species with a concentration of reactants using a plasma with a plasma volume. It will be understood that MSCD device 5 is used to illustrate the method to modify the reactants in a preferred embodiment and that other similar MSCD device structures could be used. One such device structure can be found in pending U.S. patent application Ser. No. 09/932,913, entitled "MHCD and Microfluidic Apparatus and Method" filed August 20 2001 now U.S. Pat. No. 6,596,885.

The method to treat the chemical species involves generating the plasma with a high density of high-energy electrons which interact with the reactants to produce ionized atoms and radicals. This increases the chemical reactivity of the concentration of reactants and allows their transformation to a desired byproduct. It will be understood that the transformation of the reactants can be through oxidation, reduction, or combinations thereof.

In fabricating MSCD device 5 in the preferred embodiment, a ceramic material layer 10 is screen-printed with a conductive material layer 12 and a ceramic material layer 14 is screen-printed with a conductive material layer 16. Conductive material layers 12 and 16 function as two electrodes separated by a distance 17 wherein layers 12 and 16 are generally screen-printed using a metal paste.

In the preferred embodiment, ceramic material layer 14 is positioned on conductive material layer 12 and a ceramic material layer 18 is positioned on conductive material layer 16 to form a ceramic material region 22 with a thickness, L. It will be understood that regions 10, 14, and 18 are illustrated as a single layer for simplicity, but each region can include multiple layers. Further, it will be understood that the steps in forming region 22 can be performed in other sequences and the sequence described in the preferred embodiment is for illustrative purposes only.

In the preferred embodiment, dielectric material layers 10, 14, and 18 include a low temperature co-fired ceramic (hereinafter referred to as "LTCC"). However, it will be understood that layers 10, 14, and 18 could include other suitable dielectric materials. Further, in the preferred embodiment, conductive material layers 12 and 16 include a platinum (Pt) paste. However, it will be understood that layers 12 and 16 can include other conductive materials, such as a silver (Ag) paste, or any other suitable conductive paste which can be screen-printed or otherwise applied. Further, portions of layers 12 and 16 (not shown) can include ruthenium oxide (RuO) to act as a ballast resistor, as will be discussed separately in FIG. 2, to improve the stability and performance of MSCD device 5.

Platinum (Pt) paste typically has more stable operation with a lower breakdown voltage and an improved lifetime than silver (Ag) paste wherein silver (Ag) paste oxidizes and is sputtered more readily. A metal paste that does not sputter will have a longer lifetime and a metal paste that does not oxidize will have a smaller breakdown voltage. Further, layers 12 and 16 can also include other metals, such as platinum (Pt), gold (Au), silver (Ag), molybdenum (Mo), tungsten (W), ruthenium (Ru), zirconium (Zr), titanium (Ti), palladium (Pd), carbon (C), or the like, which can be deposited with conventional semiconductor deposition techniques well known to those skilled in the art. Further, layers 12 and 16 can include a catalytic electrode material such as platinum (Pt), vanadium oxide (VO), tungsten oxide (WO), titanium oxide (TiO), zinc oxide (ZnO), or the like. Catalytic materials are often used to remediate car exhaust, for example.

Region 22 is typically held together by applying a force or pressure to ceramic material region 22 so that regions 10, 14, and 18 are bonded together, as will be discussed presently. In the preferred embodiment, a trench 20 with a width, W, is punched through ceramic material region 22 wherein trench 20 typically has a cylindrical shape. However, it will be understood that trench 20 can be formed using other methods, such as laser ablation or the like. The width of trench 20 is typically less than 500 $\mu$m wherein the width of trench 20 is chosen for the size of the chemical species or particulate to be reduced. Further, openings 11, 13, and 15 are generally circular in shape (See FIG. 2). However, it will be understood that openings 11, 13, and 15 can have other shapes, such as square, elliptical, or the like.

In the preferred embodiment, micro-scale cavity discharge device 5 has an aspect ratio of approximately 1.0. However, it will be understood that the aspect ratio of device 5 can be in a range given approximately from 0.1 to 10. It is well known by those skilled in the art that the aspect ratio is given by W/L, wherein W is the width of trench 20 and L is the thickness of ceramic material region 22.

Trench 20 and layers 10, 12, 14, 16, and 18 form MSCD device 5. MSCD device 5 is capable of containing an environment for carrying a plasma discharge within trench 20 to generate a plasma based electromagnetic emission. Here it will be understood that the term "electromagnetic emission" includes UV to infrared emission, various particles (e.g. electrons, protons, ions, etc.), and any other emissions capable of being formed by the plasma discharge.

It will be understood that the plasma discharge can be generated by a direct current (hereinafter referred to as "DC") or alternating current (hereinafter referred to as "AC") or radio frequency (hereinafter referred to as "RF") power source. For the DC power source, the plasma discharge creates very high energy electrons which are capable of breaking down most chemical bonds to induce different photochemical reactions.

In the preferred embodiment, a flux of material 26 with a concentration of reactants is capable of flowing incident to a surface 34 and therethrough trench 20 to interact with the plasma generated by layers 12 and 16. It will be understood that flux of materials 26 can include a gas, a gas with solid particles, a liquid, or similar chemical flux capable of being transformed by the plasma. The plasma transforms (i.e. typically through oxidation or reduction) the concentration of reactants included in gas 26 and forms a gas 28 which flows from the plasma past a surface 36 and out of trench 20.

The stable electrical characteristics of MSCD device 5 can depend on the electrode material, the ballast resistor, the electrode geometry and dimensions, and the nature and pressure of the gas (environment) within trench 20. Generally, MSCD devices are contemplated for which Paschen's law parameters can be exploited to control the characteristics of the discharge.

MSCD device 5 is capable of containing an environment for carrying a plasma discharge within MSCD device 5 to generate a plasma based electromagnetic emission when a cathode discharge potential is applied to conductive layers 12 and 16. In this embodiment, the cavity (i.e. trench 20) is open at both ends so that a variety of environments, cathode discharge potentials, gas species and pressures can be applied through an encompassing assembly (e.g. a larger housing, interconnecting conduits, etc.) to "tune" the energy distribution and density of electrons in the plasma discharge to optimize the desired chemical processing properties. For example, the cavity can be tuned to change the emitted light energy to any desired wavelength in a range from infrared to ultraviolet (i.e. electronic tuning).

In the preferred embodiment, there are several methods to tune the plasma to a desired plasma energy and a desired plasma density. Tuning the plasma, for example, can include adjusting a pressure proximate to micro-scale cavity discharge device 5 to obtain the desired plasma energy and density. In typical applications, the pressure is within a range given approximately from 0.5 atmospheres to 1.5 atmospheres, but it will be understood that other pressures may be appropriate.

Another method of tuning the plasma can include choosing the diameter of micro-cavity discharge device 5 to obtain the desired plasma energy and density. The diameter is typically within a range given approximately from one micron to one centimeter, but it will be understood that other the diameter could be outside this range for certain applications.

Still another method of tuning the plasma can include using electromagnetic tuning to adjust the desired plasma density and energy. In one embodiment of this method, an electrode can be positioned proximate to micro-scale cavity discharge device 5 wherein a time dependent potential difference is applied between said electrode and device 5. The potential difference and the modulation scheme could be adjusted to obtain the desired plasma energy and density.

In some embodiments of device 5, a material region 30 and a material region 32 of layer 14 can be removed to improve the performance of device 5, as is discussed in more detail in a pending U.S. patent application Ser. No. 10/174,234, entitled "Electrode Design for Stable Micro-Scale Plasma Discharges", filed Jun. 18 2002.

Illustrated in MSCD device 5 are layers of green or unfired ceramic materials with portions thereof broken away. As understood in the art, unfired or green sheets or layers (e.g. layers 10, 14, and 18) are formed of unfired or green ceramic material which usually includes aluminum oxide (AlO) particles, glass particles, and an organic binder, generally including organic material. Further, conductive layers 12 and 16 define electrodes and surround the openings. It will be understood that electrodes 12 and 16 can be electromagnetically connected to additional electrical components, such as transistors, capacitors, inductors, resistors, or the like, wherein the components can be integrated within ceramic material region 22 by including additional ceramic layers (not shown).

After stacking and alignment of the sheets is accomplished, the stack is pressed under a uniaxial pressure (e.g. 0 psi to 5000 psi) at an elevated temperature (e.g. 500° C. to 1500° C.) to produce bonding between adjacent sheets. As understood by those skilled in the art, the pressure and temperature must be sufficient to produce some bonding between the binders of adjacent sheets.

Once the stack of unfired or green ceramic sheets has been bonded together, the stack can be cut or otherwise divided into individual modules. The cutting is easily accomplished since the sheets are still formed of unfired or green ceramic. As is understood in the art, the firing temperature is generally dictated by the composition of the green ceramic material. In most cases, the glass particles melt sufficiently to bind the aluminum particles together at a temperature of approximately 875° C.

During the firing process, most of the organic binder is driven off to leave a ceramic comprising aluminum oxide (AlO) particles bound together by the at the least partially melted and reformed glass. Also, the various sheets are bound into a virtually single structure by the firing process. In the firing process the individual modules contract or shrink approximately 13%, but the shrinkage is substantially uniform so that it does not affect the final module and the final size of features (e.g. trench 20) can easily be calculated.

A stack of dielectric layers is used to form MSCD device 5 wherein the dielectric material can be any convenient material which is capable of withstanding a plasma discharge within a micro-scale cavity discharge to generate a plasma based electromagnetic emission (as will be explained in more detail presently). Typical materials that can be used include ceramic, various polymeric material (e.g. PDMS or poly dimethyl sulfoxane), PMMA plus hybrid system, some materials used in the semiconductor art, etc.

In the following description, for convenience, the layers are formed of green or unfired ceramic which, as explained above, is assembled and fired to form a single unit. It will be understood, however, that many of the steps of formation and usage described herein can be incorporated with other materials (e.g. various polymers and some materials used in the semiconductor art) and other fabrication techniques in a similar fashion. Other fabrication techniques can include, but are not limited to, soft lithography, molecular imprinting, microfabrication, etc.

Figure 2:
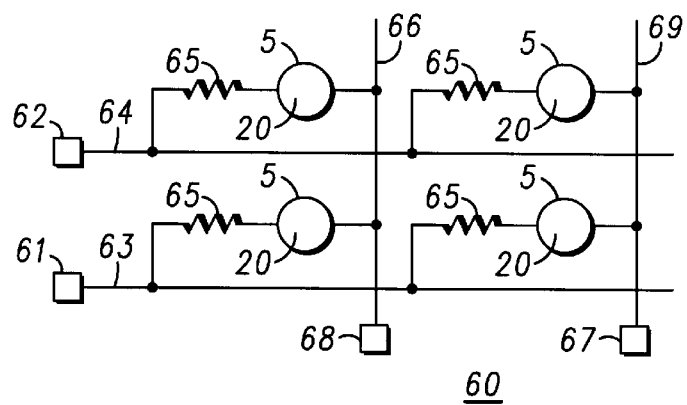
FIG. 2 is a plan view of an array of micro-scale cavity discharge devices in accordance with the present invention.

It is anticipated that MSCD device 5 will be formed as a ceramic module that includes an array of MSCD devices 5 formed in a single ceramic module 60, as illustrated in FIG. 2. In the example of module 60, electrical traces 64 and 66 can be included to connect to external contact pads 62 and 68, respectively, for unique matricial addressing (e.g. by row and by column). Contact pads 61 and 67, as well as electrical traces 63 and 69, are also included for addressing other MSCD devices included in module 60. A resistor 65, referred to as a ballast resistor, is electrically connected between MSCD device 5 and electrical trace 64. However, it will be understood that resistor 65 is optional, but is included in this embodiment to improve the stability and performance of module 60. As mentioned previously, resistor 65 can include ruthenium oxide (RuO) and can be integrated on a substrate ceramic with MSCD device 5 to form a compact module. In the preferred embodiment, resistor 65 is formed from a material film having a resistivity value approximately equal to 10 k$\Omega$/square. However, it will be understood that other resistivity values may be appropriate.

It will be understood that resistor 65 is electrically connected between device 5 and electrical trace 64 for illustrative purposes only wherein it is anticipated that a resistor could be electrically connected between MSCD device 5 and electrical trace 66 both with and without resistor 65. Further, it is anticipated that each resistor 65 in module 60 can have different resistive values, but are illustrated as having the same resistive value for simplicity and ease of discussion.

Resistor 65 is included in the preferred embodiment to provide stability and uniformity. Resistor 65 behaves as a passive negative feedback element. However, it will be understood that other circuit elements well known by those skilled in the art could be included to provide negative feedback. The stability of ceramic module 60 is increased if a current as a function of time flowing through MSCD device 5 is substantially constant. The uniformity of ceramic module 60 is increased if the current flowing through each MSCD device 5 in ceramic module 60 is approximately equal.

Further, module 60 forms a screen wherein each MSCD device 5 forms a pore wherein gas 26 can flow therethrough trench 20 to interact with the plasma and be transformed to gas 28, as discussed previously. Also, module 60 is illustrated with four MSCD devices, but it will be understood that module 60 can include any number of MSCD devices greater than or equal to one.

While a single module 60 is disclosed by FIG. 2, it will be understood by those skilled in the art that, for convenience in manufacturing, components of a plurality of modules are generally defined on each sheet. Also, laminated ceramic devices are generally formed using a plurality of the sheets (sometimes are many as fifty), which are stacked or positioned in overlying relationship. As is understood by those skilled in the art, the sheets are very thin (on the order of several tens to a few hundreds of microns) and, generally, the total number of sheets used depends upon the circuit or circuits being integrated. During the stacking process, the sheets are vertically aligned to form common modules sides and features (e.g. trench 20) through the entire stack (i.e. each module layer in a sheet overlies mating module layers in lower sheets).

Further, the width of trench 20 for the MSCD devices included in module 60 are equal for each MSCD device 5.

However, it will be understood that in some embodiments, it is anticipated that the width of trench 20 can be varied throughout the array to transform an inhomogeneous flow of reactants more efficiently. Further, some MSCD devices in module 60 can include different electrode materials than others, such as an electrode catalyst material, to provide selectivity when transforming reactants.

A catalyst material can be a reduction catalyst or an oxidation catalyst. Both types of catalysts utilize a metal catalyst, such as platinum (Pt), rhodium (Rh), palladium (Pd), or combinations thereof. The reduction catalyst, for example, usually uses platinum (Pt) or rhodium (Rh) to help reduce nitrogen oxide (NO) emissions wherein the catalyst attaches to a nitrogen (N) atom to form $N_2$ and to free an oxygen (O) atom to form $O_2$ (i.e. $2NO \rightarrow N_2+O_2$ or $2NO_2 \rightarrow N_2+2O_2$). The oxidation catalyst, for example, usually uses platinum (Pt) or palladium (Pd) to reduce unburned hydrocarbons and carbon oxide (CO) emissions wherein the catalyst creates oxygen (O) ions which react with the carbon (C) molecules (i.e. $2CO+O_2 \rightarrow 2CO_2$).

Figure 3:
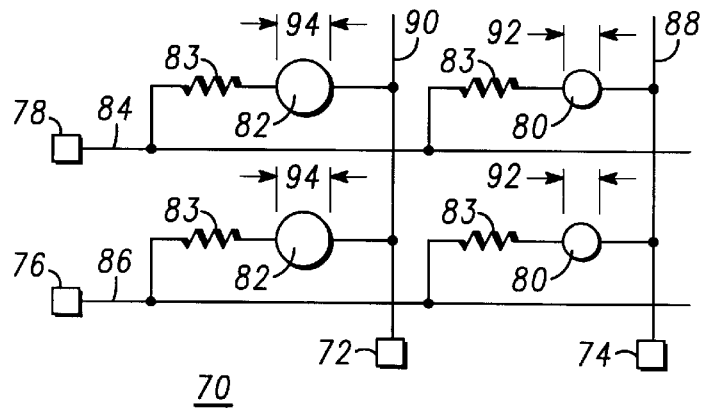
FIG. 3 is a sectional view of another embodiment of an array of micro-scale cavity discharge devices in accordance with the present invention.

The selectivity can be further enhanced by activating certain rows and columns by using external contact pads 62 and 68, as illustrated in FIG. 3 wherein the transformation of the reactant can be geometrically tuned (i.e. the width of trench 20 varies across module 60) and electrically tuned (i.e. only selected rows and columns of module 60 are activated) wherein each row and column is activated with a different voltage to generate a range of electron energies.

FIG. 3 illustrates a single ceramic module 70 which includes four MSCD devices in an array. However, it will be understood that module 70 can include any number of MSCD devices greater than or equal to one. The array includes an MSCD device 80 with a width 92 and an MSCD device 82 with a width 94 wherein width 94 is substantially greater than width 92. However, it will be understood that the array of MSCD devices included in module 70 can have various widths wherein the width depends on the addressing. The illustration of two widths 92 and 94 in this embodiment is for simplicity with many other configurations possible.

Two MSCD devices 80 are electrically connected through external contact pad 74 and conductive line 88 and two MSCD devices 94 are electrically connected through external contact pad 72 and conductive line 90. Further, a conductive line 86 and a conductive line 84 electrically connect each adjacent device 80 and 82 as illustrated and are addressed through external contact pads 76 and 78, respectively.

As discussed above, module 70 works by selectively addressing external contact pad 72 or 74. For example, if it is desired to filter a large particulate while allowing a small particulate to pass through, then a voltage can be applied to external contact pad 72, 76, and 78 to form a plasma within MSCD device 82 while external contact pad 74 is biased so that a plasma is not formed within device 80. Hence, the large particulate will interact with the plasma formed by device 82 and be blocked by the small width 92 of MSCD device 80. However, a substantial amount of the small particulate will be allowed to pass through MSCD device 80 without interacting with the plasma formed by device 82. Thus, module 80 selectively passes one size of particulate and filters out a larger size of particulate. Potential applications include particle detection systems or the like.

Figure 4:
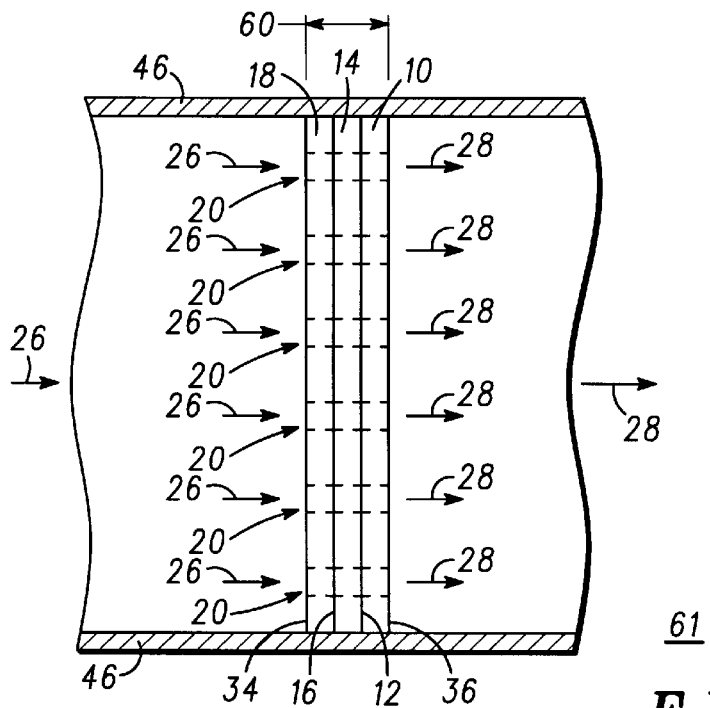
FIG. 4 is a sectional view of a micro-scale cavity discharge device positioned in an exhaust system in accordance with the present invention.

The method of reducing pollutants in gas 26 using the plasma involves positioning module 60 in an exhaust system 61, a portion of which is illustrated in FIG. 4. A power source (not shown) is electrically connected to the contact pads 61, 62, 67, and 68 (See FIG. 2) to provide power for the plasma and could be used for addressing, as discussed above. Gas 26 with a concentration of pollutants flows through exhaust system 61 and is incident on surface 34 of module 60 wherein gas 26 flows through trench 20 of device 5 to surface 36. Gas 26 can be produced, for example, from an exhaust gas generated by a diesel engine (not shown) or the like.

It will be understood that exhaust system 61 can include more than one ceramic module, but in the preferred embodiment, one ceramic module 60 is illustrated for simplicity and ease of discussion. For example, a second ceramic module (not shown) could be placed in series with ceramic module 60 wherein the second ceramic module could include a trench 20 with a width smaller than the width of trench 20 included in module 60. Gas 26 will then be partially transformed into smaller reactants by module 60 before being transformed into even smaller reactants by the second ceramic module. This would more efficiently fragment large reactants, such as soot, which typically includes large chains of carbon (C) and hydrogen (H) atoms, into smaller reactants to form aerosols, for example.

In the preferred embodiment, the plasma generated by device 5 reduces the concentration of pollutants in gas 26 to a less harmful gas 28 with a lower concentration of pollutants which flows out of exhaust system 61. For example, it is well known in the art that a diesel engine produces a high concentration of nitrogen oxide (NO) in which it is desired to break the nitrogen oxide (NO) into its elemental components through the chemical reaction described by $N_2+2NO \rightarrow 2N_2+O_2$.

A high voltage is applied to the electrodes to produce a plasma discharge which drives the chemical reaction. It is known that the conversion efficiency of these devices is increased if the emitted electrons have a high density and a high energy. Further, gas 26 can include soot, volatile organic compounds, hyrdrocarbons, carbon oxide (CO), nitrogen oxide (NO), sulfur oxide (SO), or combinations thereof. These other pollutants can also be broken up into their elemental components through similar reactions.

Turn now to FIG. 5 which illustrates a graph of a concentration of 100 parts per million (hereinafter referred to as "ppm") nitrogen oxide (NO) in nitrogen (N) in a reaction chamber similar to exhaust system 61 when an array of MSCD devices, each with the same width, is positioned therein. In this example, the array is similar to module 60 wherein the array includes n=100,000 MSCD devices. In this particular example, the width of trench 20 is assumed to be 250 $\mu$m (i.e. the radius, R, of trench 20 is equal to 125 $\mu$m) and region 22 is assumed to have a thickness, L, of 250 $\mu$m.

Figure 5:
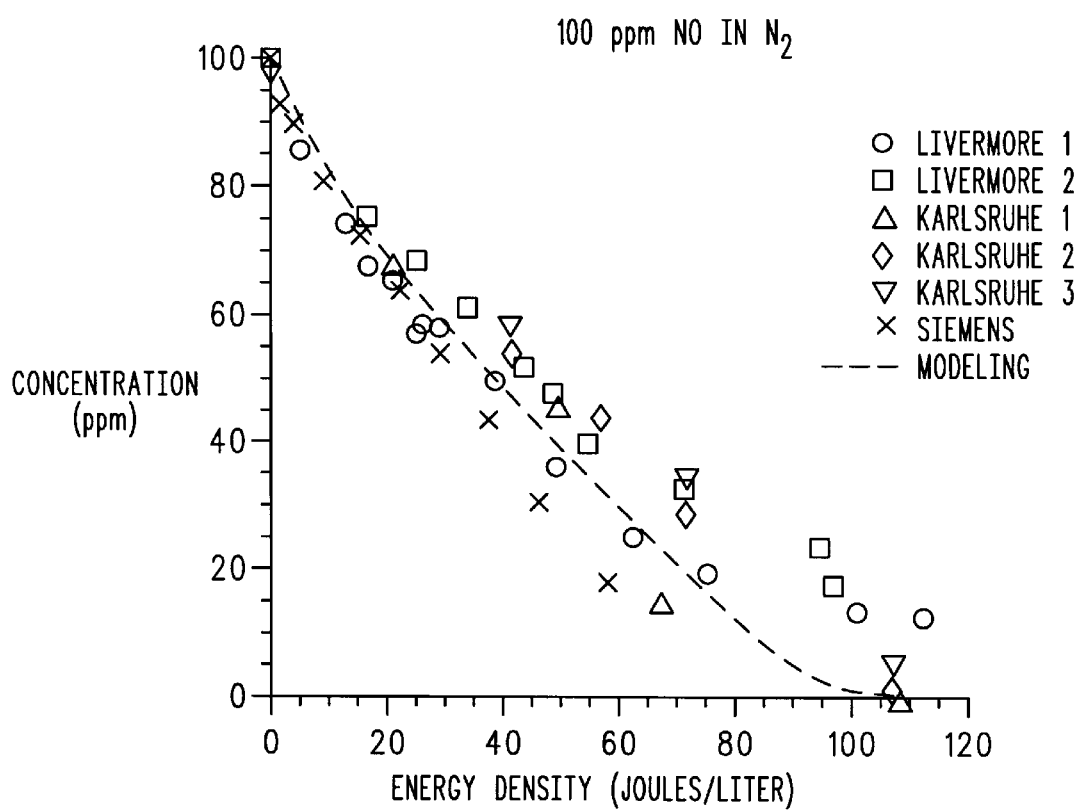
FIG. 5 is a graph illustrating the reduction of a concentration of nitrogen oxide (NO) using a micro-scale cavity discharge device in accordance with the present invention.

As illustrated in FIG. 5, the concentration of nitrogen oxide (NO) decreases as the energy density of the plasma increases. In this example, it is estimated that each MSCD device 5 in the array is consuming 6 mW. The power input, $W_T$, into the plasma for the array is $W_T=n \cdot 6$ mW wherein n is the number of devices. In this example, the power input to module 60 is 600 W or 0.80 horsepower.

The pressure drop, $\Delta P$, of the gas through MSCD device 5 can be calculated using Poiseuille's formula which is given as $$\Delta P = \frac{8 \cdot Q \cdot v \cdot L}{\pi \cdot R^4},$$

wherein Q is the mass flux per MSCD device, R is the radius of the MSCD device, L is the thickness of the MSCD device, and v is the specific viscosity. For Poiseuille's formula to be valid, the flow of gas must be laminar or streamlined. For laminar flow, the Reynold's number must be less than approximately 2000 wherein the Reynold's number is given by $$R_s = \frac{u \cdot L}{v},$$

where u is the mass velocity of the gas.

For a specific example, assume that Q=40 grams/seconds and V=0.15 cm²/seconds. Substituting these values and the values for R and L into Poiseuille formula, we get $\Delta P \approx 227$ psi. Since we have n MSCD devices in an array, the change in pressure can be rewritten as $$\Delta P = \frac{227}{n} \text{psi}.$$

Thus, for a number of MSCD devices over n=100,000, the pressure drop, $\Delta P$, is negligible (i.e.<2.27·10⁻³ psi). A negligible pressure drop in an exhaust system has a minimal impact on the efficiency of a diesel engine, for example.

Substituting the values into the equation for the Reynold's number gives $$R_s \approx \frac{1.13 \cdot 10^7}{n}.$$

For n=100,000, $R_S$ is approximately 113, which indicates that the gas flow is laminar.

The total energy density, $\gamma$, is given by $$\varepsilon = \frac{W \cdot n}{\Phi} = 1.8 \cdot 10^{-4} \cdot n \frac{J}{l}$$

wherein W is the power input per device in Watts (=6 mW), $\Phi$ is the flow rate in 1/minute where l is liters and J is Joules. Hence, for a flow rate, $\Phi$, equal to 2000 1/minute and a power input of 6 mW, $\epsilon \approx 18$ J/l, so the reduction of the concentration of 100 ppm of NO in $N_2$ illustrated in FIG. 5 is approximately 20%.

Thus, a new and improved apparatus and method for controlling particulate emissions using a micro-scale cavity discharge device has been disclosed. The method uses an array of MSCD devices to form a screen wherein a gas with a concentration of pollutants is capable of flowing through. The array of MSCD devices increases the chemical conversion efficiency of pollutants produced by combustion systems or the like, wherein the electron energy and density within the plasma has been increased. Also, the screen can be shaped to fit in a conventional exhaust system. Further, the size of the individual MSCD devices can be chosen to geometrically and electronically tune the plasma treatment properties of the array.

Applications for MSCD array 60 include, but are not limited to, providing a source of photons for lamps, lasers, and plasma display panels. MSCD array 60 can be used to provide a source of charged particles for satellite propulsion devices and electron beams. Array 60 can also be used for pollution control by detoxifying gaseous pollution generated by, for example, a diesel engine. Further, MSCD array 60 can be used for cathode sputtering for material analysis and particle detection, as well as for plasma etching and deposition.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of modifying a composition of reactants with a concentration using a plasma, the method including the steps of:

providing at least one micro-scale cavity discharge device with a diameter and an aspect ratio, the at least one micro-scale cavity discharge device being capable of sustaining the plasma wherein a first chemical species with a first composition and a first concentration flows proximate to the at least one micro-scale cavity discharge device;

providing a power source electromagnetically connected to the at least one micro-scale cavity discharge device to generate the plasma;

tuning the plasma to provide a desired plasma energy and a desired plasma density;

converting at least one of the composition and concentration of the first chemical species to at least a second chemical species within the plasma, the second chemical species having a second composition and a second concentration.

2. A method as claimed in claim 1 wherein the first chemical species includes pollutants which are reduced.

3. A method as claimed in claim 1 wherein the first chemical species includes a concentration of nitrogen oxide and the second chemical species includes a concentration of nitrogen oxide smaller than the first chemical species.

4. A method as claimed in claim 1 wherein the at least one micro-cavity discharge device includes one of a low temperature co-fired ceramic, a polymer, and another suitable dielectric material capable of withstanding the plasma.

5. A method as claimed in claim 1 wherein the first chemical species is produced from an exhaust gas.

6. A method as claimed in claim 1 including in addition a plurality of micro-scale cavity discharge devices which form a screen.

7. A method as claimed in claim 1 wherein the first chemical species includes at least one of soot, volatile organic compounds, hydrocarbons, carbon oxide, nitrogen oxide, sulfur oxide, and combinations thereof.

8. A method as claimed in claim 1 wherein a resistor is electromagnetically connected to the at least one micro-scale cavity discharge device.

9. A method as claimed in claim 8 wherein the resistor includes ruthenium oxide.

10. A method as claimed in claim 1 wherein the at least one micro-scale cavity discharge device includes at least one catalytic electrode.

11. A method as claimed in claim 10 wherein the at least one catalytic electrode includes one of platinum, vanadium oxide, tungsten oxide, titanium oxide, zinc oxide, and another suitable catalytic electrode material.

12. A method as claimed in claim 1 wherein the step of tuning the plasma includes adjusting a pressure proximate to the at least one micro-scale cavity discharge device to obtain at least one of the desired plasma energy and the desired plasma density.

13. A method as claimed in claim 12 wherein the pressure is within a range given approximately from 0.5 atmospheres to 1.5 atmospheres.

14. A method as claimed in claim 1 wherein the step of tuning the plasma includes choosing the diameter to obtain at least one of the desired plasma energy and the desired plasma density.

15. A method as claimed in claim 14 wherein the plasma diameter is within a range given approximately from one micron to one centimeter.

16. A method as claimed in claim 1 wherein the step of tuning the plasma includes using electromagnetic tuning to adjust at least one of the desired plasma density and the desired plasma energy.

17. A method as claimed in claim 1 wherein the aspect ratio is within a range given approximately from 0.1 to 10.

18. A method of modifying a chemical species with a composition of reactants and a concentration of reactants using a plasma, the method including the steps of:
  providing at least one micro-scale cavity discharge device with a diameter and an aspect ratio, the at least one micro-scale cavity discharge device forming a screen with a surface and an opposed surface, said at least one device generating the plasma wherein a first chemical species with a composition and a concentration flows proximate to at least one of the surface and the opposed surface and is transformed to a second chemical species with a composition and a concentration; and
  tuning the plasma to a desired plasma energy and a desired plasma density.

19. A method as claimed in claim 18 wherein the concentration of the second chemical species is less than the concentration of the first chemical species.

20. A method as claimed in claim 18 wherein the first chemical species includes a concentration of nitrogen oxide and the second chemical species includes a concentration of nitrogen oxide smaller than the first chemical species.

21. A method as claimed in claim 18 wherein the at least one micro-cavity discharge device includes one of a low temperature co-fired ceramic, a polymer, and another suitable dielectric material capable of withstanding the plasma.

22. A method as claimed in claim 18 wherein the first chemical species is produced from an exhaust gas.

23. A method as claimed in claim 22 wherein the exhaust gas includes at least one of soot, volatile organic compounds, hyrdrocarbons, carbon oxide, nitrogen oxide, sulfur oxide, and combinations thereof.

24. A method as claimed in claim 18 wherein a resistor is electromagnetically connected to the at least one micro-scale cavity discharge device.

25. A method as claimed in claim 24 wherein the resistor includes ruthenium oxide.

26. A method as claimed in claim 18 wherein the at least one micro-scale cavity discharge device includes at least one catalytic electrode.

27. A method as claimed in claim 26 wherein the at least one catalytic electrode includes one of platinum, vanadium oxide, tungsten oxide, titanium oxide, zinc oxide, and another suitable catalytic electrode material.

28. A method as claimed in claim 18 wherein the step of tuning the plasma includes adjusting a pressure proximate to the at least one micro-scale cavity discharge device to obtain at least one of the desired plasma energy and the desired plasma density.

29. A method as claimed in claim 28 wherein the pressure is within a range given approximately from 0.5 atmospheres to 1.5 atmospheres.

30. A method as claimed in claim 18 wherein the step of tuning the plasma includes choosing the diameter to obtain at least one of the desired plasma energy and the desired plasma density.

31. A method as claimed in claim 30 wherein the plasma diameter is within a range given approximately from one micron to one centimeter.

32. A method as claimed in claim 18 wherein the step of tuning the plasma includes using electromagnetic tuning to adjust at least one of the desired plasma density and the desired plasma energy.

33. A method as claimed in claim 18 wherein the aspect ratio is within a range given approximately from 0.1 to 10.

34. A micro-scale cavity discharge device for generating a plasma for modifying a chemical species with a composition and a concentration, the device comprising:
  a reaction chamber wherein a first chemical species with a composition and a concentration is capable of flowing therethrough;
  a tuning means to adjust the plasma to a desired plasma energy and a plasma density; and
  at least one micro-cavity discharge device with a diameter and an aspect ratio, the at least one micro-cavity discharge device being positioned within said reaction chamber wherein at least one of the composition and the concentration of the first chemical species is capable of interacting with the plasma to form a second chemical species with a composition and concentration.

35. An apparatus as claimed in claim 34 wherein the reaction chamber includes an engine exhaust pipe.

36. An apparatus as claimed in claim 34 wherein the first chemical species is generated by a vehicle exhaust system.

37. An apparatus as claimed in claim 34 wherein the at least one micro-scale cavity discharge device includes at least one electrode which includes at least one of platinum, gold, silver, titanium, ruthenium, palladium, zirconium, carbon, and alloys thereof.

38. An apparatus as claimed in claim 34 wherein the first chemical species includes a concentration of nitrogen oxide which is reduced through an interaction with the plasma.

39. An apparatus as claimed in claim 34 wherein the at least one micro-cavity discharge device includes one of a low temperature co-fired ceramic, a polymer, and another suitable dielectric material capable of withstanding the plasma.

40. An apparatus as claimed in claim 34 wherein the concentration of pollutants is produced from an exhaust gas.

41. An apparatus as claimed in claim 40 wherein the exhaust gas includes at least one of soot, volatile organic compounds, hyrdrocarbons, carbon oxide, nitrogen oxide, sulfur oxide, and combinations thereof.

42. An apparatus as claimed in claim 34 wherein a resistor is electromagnetically connected to the at least one micro-scale cavity discharge device.

43. An apparatus as claimed in claim 42 wherein the resistor includes ruthenium oxide.

44. An apparatus as claimed in claim 34 wherein the at least one micro-scale cavity discharge device includes at least one catalytic electrode.

45. An apparatus as claimed in claim 44 wherein the at least one catalytic electrode includes one of platinum, vanadium oxide, tungsten oxide, titanium oxide, zinc oxide, and another suitable catalytic electrode material.

46. An apparatus as claimed in claim 34 wherein the tuning means includes adjusting a pressure proximate to the at least one micro-scale cavity discharge device to obtain at least one of the desired plasma energy and the desired plasma density.

47. An apparatus as claimed in claim 46 wherein the pressure is within a range given approximately from 0.5 atmospheres to 1.5 atmospheres.

48. An apparatus as claimed in claim 34 wherein the tuning means includes choosing the diameter to obtain at least one of the desired plasma energy and the desired plasma density.

49. An apparatus as claimed in claim 48 wherein the plasma diameter is within a range given approximately from one micron to one centimeter.

50. An apparatus as claimed in claim 34 wherein the tuning means includes using electromagnetic tuning to adjust at least one of the desired plasma density and the desired plasma energy.

51. An apparatus as claimed in claim 34 wherein the aspect ratio is within a range given approximately from 0.1 to 10.

* * * * *